United States Patent
Joppich-Dohlus et al.

(10) Patent No.: US 11,359,935 B2
(45) Date of Patent: Jun. 14, 2022

(54) METER NETWORK AND OPERATING METHOD

(71) Applicant: DIEHL METERING SYSTEMS GMBH, Nuremberg (DE)

(72) Inventors: Petra Joppich-Dohlus, Rathsberg (DE); Adrian Kvesic, Fuerth (DE); Stefan Schmitz, Nuremberg (DE); Christoph Schmidt, Nuremberg (DE); Christian Jambor, Nuremberg (DE)

(73) Assignee: Diehl Metering Systems GmbH, Nuremberg (DE)

( * ) Notice: Subject to any disclaimer, the term of this patent is extended or adjusted under 35 U.S.C. 154(b) by 0 days.

(21) Appl. No.: 16/994,848

(22) Filed: Aug. 17, 2020

(65) Prior Publication Data
US 2021/0048314 A1 Feb. 18, 2021

(30) Foreign Application Priority Data
Aug. 16, 2019 (DE) .............................. 102019005743

(51) Int. Cl.
G08B 23/00 (2006.01)
G01D 4/00 (2006.01)
H04Q 9/00 (2006.01)

(52) U.S. Cl.
CPC ............... *G01D 4/004* (2013.01); *H04Q 9/00* (2013.01); *H04Q 2209/40* (2013.01)

(58) Field of Classification Search
CPC ....... G01D 4/004; H04Q 9/00; H04Q 2209/40
(Continued)

(56) References Cited

U.S. PATENT DOCUMENTS 10,209,092 B2  2/2019  Petkov et al.
2001/0046862 A1*  11/2001  Coppinger .............. H04L 12/66
                                                 455/410

(Continued)

FOREIGN PATENT DOCUMENTS

DE     102016010047 A1   2/2018
EP        3515019 A1   7/2019
KR      20180091516 A   8/2018

OTHER PUBLICATIONS

OMS: "Open Metering System Specification", vol. 3, Tertiary Communication and OMS-MUC, Issue 2.0.0 Jan. 31, 2011 (Release).
(Continued)

*Primary Examiner* — Naomi J Small
(74) *Attorney, Agent, or Firm* — Laurence A. Greenberg; Werner H. Stemer; Ralph E. Locher

(57) ABSTRACT

A meter network includes a meter configuration having a meter, a communication module, and a remote station for the configuration in a wide area network. The meter and communication module are pairable for a wireless local area communication by using communication technology and communication protocol. The communication module and remote station are connectable for a wide area communication by using network technology and network protocol. The communication module includes a protocol converter for converting data to be communicated via the local area communication, communication module and wide area communication between the communication technology and network technology and between the communication protocol and network protocol. A method for operating the meter network pairs the meter and communication module, connects the communication module and remote station, and uses the protocol converter to convert data between the local area communication technology and network technology (Continued)

and between the communication protocol and network protocol.

11 Claims, 1 Drawing Sheet

(58) Field of Classification Search
USPC .................................................. 340/870.02
See application file for complete search history.

(56) References Cited

U.S. PATENT DOCUMENTS

| | | | |
|---|---|---|---|
| 2002/0125998 A1 | 9/2002 | Petite et al. | |
| 2011/0176417 A1* | 7/2011 | Kuwabara | H04W 36/22 370/230 |
| 2011/0285543 A1 | 11/2011 | Ehrke et al. | |
| 2011/0307932 A1* | 12/2011 | Fan | H04N 21/8126 725/110 |
| 2015/0185311 A1* | 7/2015 | Lohier | G06F 21/44 367/118 |
| 2015/0325114 A1 | 11/2015 | Sobotka et al. | |
| 2016/0301778 A1 | 10/2016 | Gupta et al. | |
| 2017/0150239 A1* | 5/2017 | Davis | G08C 17/02 |
| 2018/0077642 A1* | 3/2018 | Mandiganal | H04L 12/2803 |
| 2019/0028997 A1* | 1/2019 | Inoue | G06F 1/163 |
| 2019/0044831 A1* | 2/2019 | Guim Bernat | H04L 41/5019 |
| 2019/0234786 A1 | 8/2019 | Klicpera | |
| 2019/0342639 A1* | 11/2019 | Christiansen | H04L 1/0007 |

OTHER PUBLICATIONS

Hauser et al.: "Communication in Smart Water Networks", SWAN The Smart Water Networks Forum, SWAN Forum Interoperability Workgroup, Jun. 2016.
Wikipedia: "OBIS-Kennzahlen", Version Jan. 24, 2019 [OBIS key figures]—English version.

* cited by examiner

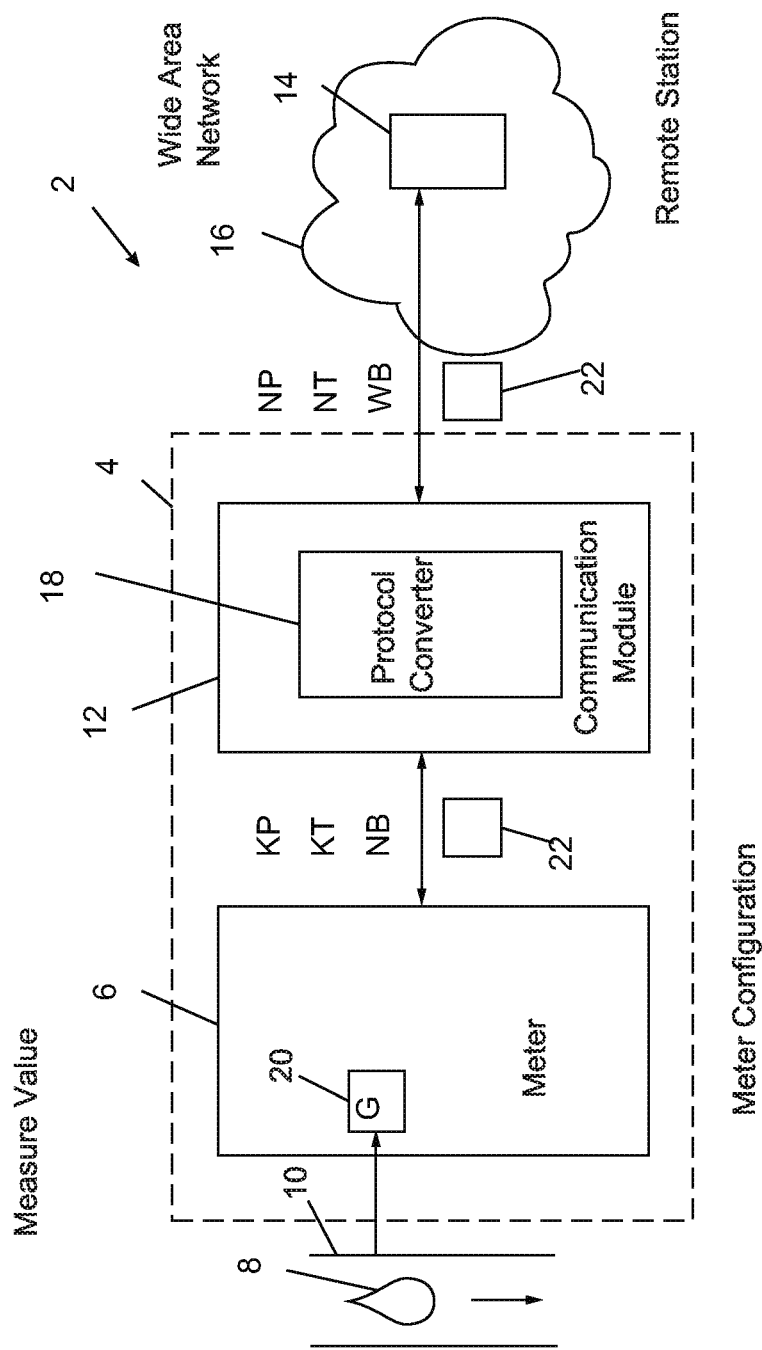

METER NETWORK AND OPERATING METHOD

CROSS-REFERENCE TO RELATED APPLICATION

This application claims the priority, under 35 U.S.C. § 119, of German Patent Application DE 10 2019 005 743, filed Aug. 16, 2019; the prior application is herewith incorporated by reference in its entirety.

BACKGROUND OF THE INVENTION

Field of the Invention

The invention relates to a meter network including a meter configuration containing a meter for measuring a consumption quantity of a consumption medium and a communication module. The meter network also includes a remote station for the meter configuration in a wide area network. The invention also relates to a method for operating the meter network.

A meter configuration which is known, in particular from practical use, contains a meter and an internal or external communication unit (communication module) which uses the MBus (meter bus, fieldbus) protocol or the wMBus (wireless MBus) protocol for communication. Data (e.g. a consumption quantity of a consumption medium measured by the meter) are sent to a data concentrator. The application data are forwarded there in packets using a network technology, e.g. 3G, in particular using a WAN (wide area network) technology via a wide area network, e.g. the Internet, to the remote station in the WAN.

The following is known from German Patent Application DE 10 2016 010 047 A1, corresponding to U.S. Pat. No. 10,209,092: if the relay function of a stationarily operated concentrator is not yet available, for example in a set-up phase, for the radio transmission of data packets from a meter incorporated into a smart metering network to a control center, mobile units which are moving in the local environment of the network, and therefore from time to time also in the vicinity of the individual meters of the network, are used in any event temporarily for bridging purposes for the relay function. Persons and/or vehicles equipped with communication devices such as smartphones for long-haul links according to the Internet standard or the mobile radio standard serve as mobile units of that type. They are constructed, as modified mobile radio telephones, through hardware or through a software app, to receive the data packet from a meter via a short-haul link to the mobile unit which is by chance temporarily located in the vicinity of that meter at that time. The long-haul transmission of the packet from the mobile unit to the control center can be performed according to the Internet standard or the mobile radio standard.

BRIEF SUMMARY OF THE INVENTION

It is accordingly an object of the invention to provide an improved meter network and an improved operating method, which overcome the hereinafore-mentioned disadvantages of the heretofore-known networks and methods of this general type.

With the foregoing and other objects in view there is provided, in accordance with the invention, a meter network including a meter configuration. The meter configuration contains a meter. The meter serves to measure a consumption quantity (e.g. a cubic meter value) of a consumption medium (e.g. natural gas or water). The meter configuration further contains a communication module. This is, in particular, structurally separated from the meter. This means that the two components have no common structural parts, system parts, no common housing, etc. They then constitute two separate devices.

The meter network further contains a remote station for the meter configuration. The remote station is disposed in a wide area network (WAN), e.g. the Internet.

The meter and the communication module can be paired to provide—particularly wireless—local area communication by using a communication technology using a communication protocol. The communication module and the remote station are connectable to provide—particularly wireless—wide area communication by using a network technology using a network protocol.

"Local area" means, in particular, in each case less than 10 cm or 50 cm or 1 m or 5 m or 10 m or 100 m or 1 km. "Wide area" means, in particular, in each case more than 10 cm or 50 cm or 1 m or 5 m or 10 m or 100 m or 1 km. The remote station is, in particular, a head-end system, e.g. a portal of an energy supply company. The consumption quantity or its value is, in particular, a measured value, e.g. a present value or an instantaneous recording, such as a meter value, an instantaneous electrical power, etc. Alternatively, the consumption quantity is a value for a time period, such as e.g. a total daily, monthly or annual consumption, etc.

"Can be paired" or "configured to be paired" means that the elements are correspondingly "pairable" or are paired in an operational state. "Connectable" or "configured to be connected" means that the elements are connected in an operational state. The corresponding statements also apply accordingly to the following descriptions.

During operation, data are to be communicated within the meter network between the meter and the remote station via the communication module. The communication passes via the local area communication, the communication module and the wide area communication or in the opposite direction. Data which are to be communicated are, for example, values of the consumption quantity with an associated timestamp from the meter to the remote station, or configuration data from the remote station to the meter.

The communication module contains a protocol converter. The converter is configured, e.g. through hardwiring or programming, to convert the data between the local area communication technology and the network technology. The protocol converter is further configured to also convert the data between the communication protocol and the network protocol.

"Communication" relates in each case to both directions, both in the direction from the meter to the remote station and vice versa. The aforementioned "technologies" also include, in each case in relation to the OSI (Open Systems Interconnection) seven layer model, at least the physical layer (layer 1), possibly higher layers also, but never the application layer (layer 7). The aforementioned "protocols" accordingly also include at least the application layer, possibly lower layers also, but under no circumstances the physical layer.

The data are therefore not simply forwarded unchanged as existing packets in the communication module, but are "repacked," i.e. the packets per se are disassembled and only the pure (payload) content is converted between technologies and protocols. Packets are therefore at least modified.

The invention offers the advantage that the employed network technology or network protocol is decoupled from the meter. The meter can thus be paired with different communication modules. The communication modules can in each case have the communication technology and the communication protocol which are implemented in the meter, i.e. in particular the identical or same communication technology/communication protocol. However, the communication modules may differ in terms of network technology/network protocol.

By linking the meter to a corresponding communication module, a meter can be made available relatively quickly for a network technology/network protocol with associated security mechanisms. In emerging technology/protocols such as, for example, NBIoT (Narrow Band Internet of Things), the meter can therefore be incorporated relatively quickly through pairing with a communication module. The communication module must simply be equipped accordingly on the remote station side for the emerging technology/protocol.

A new and elaborate certification of the meter is not necessary due to the decoupling (of the meter from the communication module, but rather only addition/pairing/exchange of the communication module).

Due to the (optional) wireless coupling (local area communication, in particular radio coupling) between the meter and the communication module, no mechanical access to the meter is required with respect to equipment/changeover of the network technology/network protocol. An update or modification of the network technology/network protocol is decoupled from the meter. No access to the meter is therefore required.

In one preferred embodiment, the meter and/or the communication module is/are in each case separately battery-operated. The communication module can thus, for example, be particularly easily exchanged. This is particularly suitable for the wireless variant.

In one preferred embodiment, the meter and the communication module can be paired with one another in a fixed and/or permanent manner. This means, in particular, a "1-to-1" pairing, i.e. no further pairing partner is involved. The corresponding statement does not apply to the temporal aspect in the sense of a continuous pairing without interruption.

In one preferred embodiment, the meter and the communication module can be paired with one another in a secured manner (e.g. encrypted/one-to-one exclusive assignment of two specific partners). A manipulation of the communication between the meter and the communication module is therefore prevented.

In one preferred embodiment, the meter and the communication module can be paired with one another via BLE (Bluetooth low energy) as the communication technology and/or via MBus (optionally wMBus also) as the communication protocol. The invention can thus be implemented simply and economically using conventional local area technologies and protocols.

In one preferred embodiment, the meter is configured to transmit application data as the data via the local area communication. According to the invention, application data of this type can also be converted in terms of technology and protocol in the communication module.

In one preferred embodiment, the communication module and the remote station are interconnectable via NBIoT or LoRaWAN (Long Range WAN) as the network technology and/or via LwM2M (Lightweight Machine-to-Machine) as the network protocol. For LoRaWAN in particular, other corresponding network protocols are also conceivable. In one preferred variant of this embodiment, an associated data link layer is assigned to the LwM2M network protocol. This data link layer is, in particular, DTLS (Datagram Transport Layer Security). The invention can thus be implemented simply and economically using conventional wide area technologies and protocols.

In one preferred embodiment, the protocol converter is configured to decrypt and evaluate communication protocol data as the data (in the application layer) and convert the data into a network protocol object model. The same also applies in reverse (conversion from the network protocol to the communication protocol). In particular, MBus data are converted into the LwM2M object model. The corresponding conversion can thus be carried out particularly effectively.

With the objects of the invention in view, there is concomitantly provided a method for operating a meter network, in which the meter and the communication module are paired by using communication technology using the communication protocol, and the communication module and the remote station are connected by using the network technology using the network protocol. The protocol converter further converts the data which are communicated between the meter and the remote station via the local area communication, the communication module and the wide area communication, between both the local area communication technology and the network technology. It similarly also converts the data between the communication protocol and the network protocol.

The method and at least some of its embodiments and the respective advantages have already been explained accordingly in connection with the meter network according to the invention.

In one preferred embodiment, starting from the—henceforth "first"—communication module with the—henceforth "first"—network technology and the—henceforth "first"—network protocol, the meter is disconnected from the first communication module (pairing) and the first communication module is disconnected from the remote station (connection). The meter is then paired with a second or further communication module which has a second or further network technology differing from the first network technology and/or a second or further network protocol differing from the first network protocol. The second or further communication module and the remote station are connected. The data are communicated between the meter and the remote station via the second or further communication module and are then converted, as explained above, but with respect to the second or further network technology/network protocol.

A simple "changeover" of the meter configuration to an alternative second network technology is thus performed.

The invention is based on the following realizations, observations or considerations and also includes the following embodiments. The embodiments are also referred to partly for simplification as "the invention." In this case, the embodiments may also contain parts or combinations of the aforementioned embodiments or may correspond thereto and/or may possibly also include heretofore unmentioned embodiments.

The invention is based, in particular, on the notion that a battery-operated meter uses a battery-operated communication module for the communication of data via a network technology using a network protocol. The meter and the communication module are paired with one another in a secure manner, in particular using BLE technology. The meter uses, in particular, the MBus protocol via BLE to transmit the application data. The NBIoT network technology and the LwM2M protocol, in particular, are implemented in the communication module. The communication module decrypts the MBus data, evaluates the data and converts the data into the LwM2M object model for the communication. These data are then communicated to the network using the LwM2M protocol and associated data link layers, such as e.g. DTLS. A receive channel exists accordingly which receives data via the network and forwards the data to the meter. A protocol converter is provided in the communication module for this purpose. It is therefore also possible to implement modules with other network technologies, such as, for example, LoRa with corresponding protocols.

According to the invention, in particular, a battery-operated meter is paired with a battery-operated communication module for the communication of data using a communication technology and a communication protocol. In particular, the meter and the communication module are paired with one another in a secured manner via BLE technology. The meter uses, in particular, the MBus protocol to transmit the application data (data). The NBIoT network technology and the LwM2M (network/application) protocol, in particular, are implemented in the communication module. The communication module decrypts the MBus data, evaluates the data (in the application layer, the highest layer of the OSI 7-layer model) and converts the data into the LwM2M object model for the communication. The protocol converter, in particular, performs this operation. The data are then communicated to the network (WB network) and to a server (remote station) using the LwM2M protocol and associated data link layers, such as e.g. DTLS. A corresponding receive channel exists for data via the network. A protocol converter is provided in the communication module for this purpose. It is therefore also possible to implement modules with other network technologies, such as, for example, LoRa with corresponding protocols.

According to the invention, in particular, a battery-operated meter is paired (in particular permanently) with a battery-operated communication module (for the communication of data) using a standard security mechanism (BLE security) and a standard technology (BLE) or by using a communication technology using a communication protocol. The communication module guarantees the communication using a network technology (e.g. NBIoT or LoRaWAN) with a suitable protocol (e.g. LwM2M) to the server (remote station). A protocol conversion takes place in the communication module (particularly in the protocol converter), i.e. all layers (in the OSI 7-layer model) from the physical layer to the application layer are affected. The communication module therefore converts the communication between the meter and the communication module into the network protocol (and in particular the network technology).

According to the invention, a protocol converter is thus provided in the battery-operated communication module.

Other features which are considered as characteristic for the invention are set forth in the appended claims.

Although the invention is illustrated and described herein as embodied in a meter network and an operating method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The FIGURE of the drawing is a schematic block diagram of a meter network according to the invention.

DETAILED DESCRIPTION OF THE INVENTION

Referring now in detail to the single FIGURE of the drawing, there is seen a meter network 2 in a schematic block diagram. The network contains a meter configuration 4. The meter configuration contains a meter 6 which serves to measure a consumption quantity G, in this case a meter reading in cubic meters, of a consumption medium 8, in this case mains water which flows through a water pipe 10.

The meter configuration 4 further contains a communication module 12 which is structurally separated from the meter 6. Both the meter 6 and the communication module 12 can communicate toward their respective exterior space, i.e. "externally," with one another, as indicated by a double arrow. The communication between the two is a wireless local area communication NB. The meter 6 and the communication module 12 are paired with one another in a fixed, permanent and secure manner by using a communication technology KT (in this case BLE) using a communication protocol KP (in this case wMBus). This means that only these two partners, and no third party, are involved in the local area communication. The temporal aspect (permanent pairing) is not addressed herein.

The communication module 12 can further perform a wireless wide area communication WB externally with a remote station 14 of the meter network 2, in this case a head-end system, for the meter 6, in a wide area network 16, in this case a WAN in the form of the Internet, again indicated by a double arrow. The communication module 12 and the remote station 14 are connected for this purpose by using a network technology NT (in this case NBIoT) using a network protocol NP (in this case LwM2M with an assigned data link layer).

A local area communication NB for a communication between the meter 6 and the communication module 12 and a wide area communication WB for a communication between the communication module 12 and the remote station 14 thus take place if required.

The local area communication NB (once daily for a few minutes) and the wide area communication WB (once daily for a few minutes) take place in each case at certain times only, whereas no communication takes place in the pauses, between the meter 6, the communication module 12 and the remote station 14. The local area communication NB and the wide area communication WB can, but do not have to, take place simultaneously.

Neither a data concentrator nor a gateway is involved in the situation or configuration in the FIGURE or in the depicted procedure.

The meter 4 and the communication module 12 are in each case battery-operated, i.e. are self-sufficient in terms of energy, i.e. are not connected to an external power supply.

The communication module 12 contains a protocol converter 18.

During the measurement of the consumption quantity G, the present consumption quantity G is converted at a specific predefinable time into a measured value 20 (i.e. an actual measurement is carried out) and is provided with a timestamp which is not explained in detail. The time at which the consumption quantity G had a specific measured value 20 is thus known. The corresponding value pair (measured value 20/timestamp) is then transmitted in the form of data 22 over the local area communication NB to the communication module 12 and from there over the wide area communication WB to the remote station 14 and is further processed there.

The protocol converter 18 is configured for the procedure set out below, in this case by using a program in a corresponding computing device (not shown).

In this case, the data 22 are application data of an application (in this case a meter-reading program) which runs in the meter 6 in a program-controlled manner. These data 22 are communicated between the meter 6 and the remote station 14 over the local area communication NB, the communication module 12 and the wide area communication WB. The data 22 are converted by the protocol converter 18 in the communication module 12 both between the communication technology KT and the network technology NT and between the communication protocol KP and the network protocol NP.

In order to provide for the conversion (in the direction from the meter 6 to the remote station 14), the communication protocol (KP) data of the data 22 are decrypted, evaluated (in the application layer) and converted into the network protocol (NP) object model.

The conversion from the communication technology KT to the network technology NT is similarly performed.

The wide area network 16 is converted with respect to its network technology NT from NBIoT to LoRaWAN at a later time. The meter configuration 4 is changed over in order to be able to further operate to the meter 6. The meter 6 remains unchanged in this case. The communication module 12 is disconnected from the meter 6 and from the remote station 14 and is exchanged for a different communication module 12 which is equipped with the LoRaWAN network technology NT. The communication module 12 is then paired once more with the meter 6 and is reconnected to the remote station 14. It is then possible to continue with the communication of data 22 as described above, now using the alternative LoRaWAN network technology NT.

REFERENCE NUMBER LIST

2 Meter network
4 Meter configuration
6 Meter
8 Consumption medium
10 Water pipe
12 Communication module
14 Remote station
16 Wide area network
18 Protocol converter
20 Measured value
22 Data
G Consumption quantity
NB Local area communication
WB Wide area communication
KT Communication technology
KP Communication protocol
NT Network technology
NP Network protocol

The invention claimed is:

1. A meter network, comprising:
a meter configuration including a meter for measuring a consumption quantity of a consumption medium, and a first communication module;
a remote station for said meter configuration in a wide area network;
said meter and said first communication module configured to be paired for a local area communication by using a communication technology using a communication protocol;
a second communication module to be paired with said meter instead of said first communication module, said second communication module having at least one of a different network technology or a different network protocol than said first communication module;
said paired first or second communication module being a single exchangeable communication module for said meter, and no further partner being paired with said meter and said first or second communication module;
said meter and said first and second communication modules being separately battery-operated;
said first communication module and said remote station configured to be connected for a wide area communication by using a network technology using a network protocol; and
said first communication module including a protocol converter configured to convert data to be communicated between said meter and said remote station over said local area communication, said communication module and said wide area communication, both between said first communication technology and said network technology and between said communication protocol and said network protocol.

2. The meter network according to claim 1, wherein said meter and said first communication module are configured to be paired with one another in at least one of a fixed or a permanent manner.

3. The meter network according to claim 1, wherein said meter and said first communication module are configured to be paired with one another in a secured manner.

4. The meter network according to claim 1, wherein said meter and said first communication module are configured to be paired with one another at least one of via BLE as said communication technology or via MBus as said communication protocol.

5. The meter network according to claim 1, wherein said meter is configured to transmit application data as said data via said local area communication.

6. The meter network according to claim 1, wherein said first communication module and said remote station are configured to be interconnected at least one of via NBIoT or LoRaWAN as said network technology or via LwM2M as said network protocol.

7. The meter network according to claim 6, wherein an associated data link layer is assigned to said LwM2M network protocol.

8. The meter network according to claim 1, wherein said protocol converter is configured to decrypt and evaluate communication protocol data and convert said data into a network protocol object model, and vice versa.

9. A method for operating a meter network according to claim 1, the method comprising the following steps:
pairing said meter and said first communication module by using said communication technology using said communication protocol;
interconnecting said first communication module and said remote station by using said network technology using said network protocol;
using said protocol converter to convert said data communicated between said meter and said remote station via said local area communication, said first communication module and said wide area communication, both between said local area communication technology and said network technology and between said communication protocol and said network protocol;

based on said first communication module with said network technology and said network protocol:

disconnecting said meter from said first communication module and disconnecting said first communication module from said remote station, pairing said meter with said second communication module having at least one of a different network technology or a different network protocol than said first communication module, interconnecting said second communication module and said remote station, and communicating the data between said meter and said remote station via said second communication module; and providing either said first or said second communication module as a single exchangeable communication module and pairing no further partner with said meter and said first or second communication module.

10. The meter network according to claim 1, wherein said meter and said first communication module are configured to be paired with one another in at least one of a fixed or permanent or secure manner.

11. The method according to claim 9, which further comprises pairing said meter and said first communication module with one another in at least one of a fixed or permanent or secure manner.

* * * * *